(12) United States Patent
Naota et al.

(10) Patent No.: US 9,367,259 B2
(45) Date of Patent: Jun. 14, 2016

(54) ELECTRONIC DEVICE MIRRORING DEVICE SETTING

(71) Applicant: KYOCERA Document Solutions Inc., Osaka (JP)

(72) Inventors: Tomonori Naota, Osaka (JP); Masaki Kikuchi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 278 days.

(21) Appl. No.: 13/939,013

(22) Filed: Jul. 10, 2013

(65) Prior Publication Data

US 2014/0032863 A1  Jan. 30, 2014

(30) Foreign Application Priority Data

Jul. 27, 2012 (JP) .................................. 2012-167701

(51) Int. Cl.
| | | |
|---|---|---|
| G06F 12/00 | (2006.01) | |
| G06F 3/06 | (2006.01) | |
| G06F 11/14 | (2006.01) | |
| G06F 11/20 | (2006.01) | |

(52) U.S. Cl.
CPC .............. *G06F 3/065* (2013.01); *G06F 3/0614* (2013.01); *G06F 3/0683* (2013.01); *G06F 11/1451* (2013.01); *G06F 11/2058* (2013.01)

(58) Field of Classification Search
CPC ............ G06F 13/0614; G06F 13/0683; G06F 13/065; G06F 11/1451; G06F 11/2058
See application file for complete search history.

(56) References Cited

U.S. PATENT DOCUMENTS

| 7,206,922 B1* | 4/2007 | Steiss ..................... G06F 9/3802 711/151 |
| 2007/0027935 A1* | 2/2007 | Haselton ............. G06F 11/1458 |
| 2007/0288712 A1* | 12/2007 | Zimoto et al. ................ 711/162 |
| 2009/0113160 A1* | 4/2009 | Ferraro .................. G06F 3/0613 711/170 |
| 2012/0047340 A1 | 2/2012 | Inaba |

FOREIGN PATENT DOCUMENTS

| JP | 09-135319 A | 5/1997 |
| JP | 11-053883 A | 2/1999 |
| JP | 2001-249852 A | 9/2001 |
| JP | 2002-143581 A | 5/2002 |
| JP | 2003-063327 A | 3/2003 |
| JP | 2006-113962 A | 4/2006 |
| JP | 2009-021788 A | 1/2009 |
| JP | 2010-049729 A | 3/2010 |
| JP | 2012-043246 | 3/2012 |

OTHER PUBLICATIONS

Office Action dated Oct. 9, 2015 from State Intellectual Property Office (SIPO) re Chinese Appl. No. 201310322496.X.

* cited by examiner

*Primary Examiner* — Kalpit Parikh
(74) *Attorney, Agent, or Firm* — McDonnell Boehnen Hulbert & Berghoff LLP

(57) ABSTRACT

An electronic device includes a target selection unit, a priority determination unit, and a mirroring execution unit. The target selection unit is configured to select, as a mirroring target, a setting value of each of items of the electronic device if the setting value is different from an initial value. The priority determination unit is configured to determine a priority of mirroring, designated for a setting value serving as the mirroring target. The mirroring execution unit is configured to perform the mirroring so as to cause a setting value, whose determined priority is relatively high, to remain on a priority basis.

20 Claims, 5 Drawing Sheets

PRIORITY LIST

| ITEM | PRIORITY |
|---|---|
| Backup Data 1 | 3 |
| Backup Data 2 | 3 |
| Backup Data 3 | 3 |
| Backup Data 4 | 2 |
| Backup Data 5 | 1 |
| Backup Data 6 | 1 |
| Backup Data 7 | 1 |
| Backup Data 8 | 1 |
| Backup Data 9 | 1 |
| Backup Data 10 | 1 |
| ⋮ | |
| Backup Data 989 | 3 |
| Backup Data 990 | 3 |
| Backup Data 991 | 3 |
| Backup Data 992 | 3 |
| Backup Data 993 | 5 |
| Backup Data 994 | 1 |
| Backup Data 995 | 1 |
| Backup Data 996 | 1 |
| Backup Data 997 | 1 |
| Backup Data 998 | 1 |
| Backup Data 999 | 1 |
| Backup Data 1000 | 4 |

CHANGE

| Backup Data 10 |
|---|

FIG. 2

PRIORITY LIST

| ITEM | PRIORITY | |
|---|---|---|
| Backup Data 1 | 4 | ⎫ |
| Backup Data 2 | 4 | ⎬ GROUP |
| Backup Data 3 | 4 | ⎭ |
| Backup Data 4 | 1 | ⎫ |
| Backup Data 5 | 1 | |
| Backup Data 6 | 1 | |
| Backup Data 7 | 1 | ⎬ GROUP |
| Backup Data 8 | 1 | |
| Backup Data 9 | 1 | |
| Backup Data 10 | 1 | ⎭ |
| ⋮ | | |
| Backup Data 989 | 3 | ⎫ |
| Backup Data 990 | 3 | ⎬ GROUP |
| Backup Data 991 | 3 | |
| Backup Data 992 | 3 | ⎭ |
| Backup Data 993 | 5 | ⎫ |
| Backup Data 994 | 5 | ⎬ GROUP |
| Backup Data 995 | 5 | |
| Backup Data 996 | 5 | ⎭ |
| Backup Data 997 | 2 | ⎫ |
| Backup Data 998 | 2 | ⎬ GROUP |
| Backup Data 999 | 2 | |
| Backup Data 1000 | 2 | ⎭ |

FIG. 5

ELECTRONIC DEVICE MIRRORING DEVICE SETTING

REFERENCE TO RELATED APPLICATIONS

This application is based upon and claims the benefit of priority from the corresponding Japanese Patent Application No. 2012-167701, filed in the Japan Patent Office on Jul. 27, 2012, the entire contents of which are incorporated herein by reference.

BACKGROUND

1. Technical Field

The present disclosure relates to an electronic device individually storing the device setting of a user in a plurality of storage units and performing mirroring.

2. Description of the Related Art

In a typical electronic device, for example, an image forming apparatus such as a digital multifunction machine or a printer, a device setting exists that spans a wide range of many items with offering an increasing range of functions. To obtain a function suitable for a user environment or a utilization purpose, in many cases, electronic devices have been used while the setting value of each item for device settings has been changed.

A device setting associated with a user is stored in a non-volatile memory within an image forming apparatus. It may be necessary for the device setting to be backed up so as to be recoverable at the time of the replacement of a non-volatile memory component or the replacement of a board that is due to the failure or the like of an electronic device.

However, owing to, for example, a production cost or the restriction of the size of the non-volatile memory, it may be difficult to back up all data, and reducing the size of data serving as a backup target has become important.

On the other hand, there has been a typical image forming apparatus that makes mirroring control feasible. The mirroring control is due to the combination of a plurality of storage units whose storage capacities or types are different, and makes the total space of the plural storages available.

When storing data in a storage unit, the typical image forming apparatus determines whether the data to be stored is data having a high degree of importance. The typical image forming apparatus performs control so that data determined as having a high degree of importance is stored in the mirroring regions of both storage units and data determined as having a low degree of importance is stored in the non-mirroring region of one storage unit.

However, so as to improve the certainty of backup, it may be necessary to cover as many items as possible of a device setting associated with the user. Therefore, as a result, the amount of data having a high degree of importance increases, and the size of data serving as a backup target also becomes large.

SUMMARY

An electronic device according to an embodiment of the present disclosure includes a target selection unit, a priority determination unit, and a mirroring execution unit. The target selection unit is configured to select, as a mirroring target, a setting value of each of items of the electronic device if the setting value is different from an initial value. The priority determination unit is configured to determine a priority of mirroring, designated for a setting value serving as the mirroring target. The mirroring execution unit is configured to perform the mirroring so as to cause a setting value whose determined priority is relatively high to remain on a priority basis.

A non-transitory computer readable recording medium according to an embodiment of the present disclosure stores a backup program for an electronic device. The backup program includes first to third program codes. The first program code causes the computer to select, as a mirroring target, a setting value of each of items of the electronic device if the setting value is different from an initial value. The second program code causes the computer to determine a priority of mirroring, designated for a setting value serving as the mirroring target. The third program code causes the computer to perform the mirroring so as to cause a setting value whose determined priority is relatively high to remain on a priority basis.

A backup method according to an embodiment of the present disclosure includes (i) selecting, via a target selection unit, a setting value of each of items of an electronic device, as a mirroring target, if the setting value is different from an initial value, (ii) judging, via a priority determination unit, a priority of mirroring, designated for a setting value serving as the mirroring target, and (iii) performing, via a mirroring execution unit, the mirroring so as to cause a setting value whose determined priority is relatively high to remain on a priority basis.

Additional features and advantages are described herein, and will be apparent from the following detailed description and the figures.

BRIEF DESCRIPTION OF THE DRAWINGS

In the accompanying drawings:

FIG. 2 illustrates a priority list;

FIG. 5 illustrates a priority list.

DETAILED DESCRIPTION

Embodiments of the present disclosure will be described with reference to drawings.

I. First Embodiment

Figure 1:
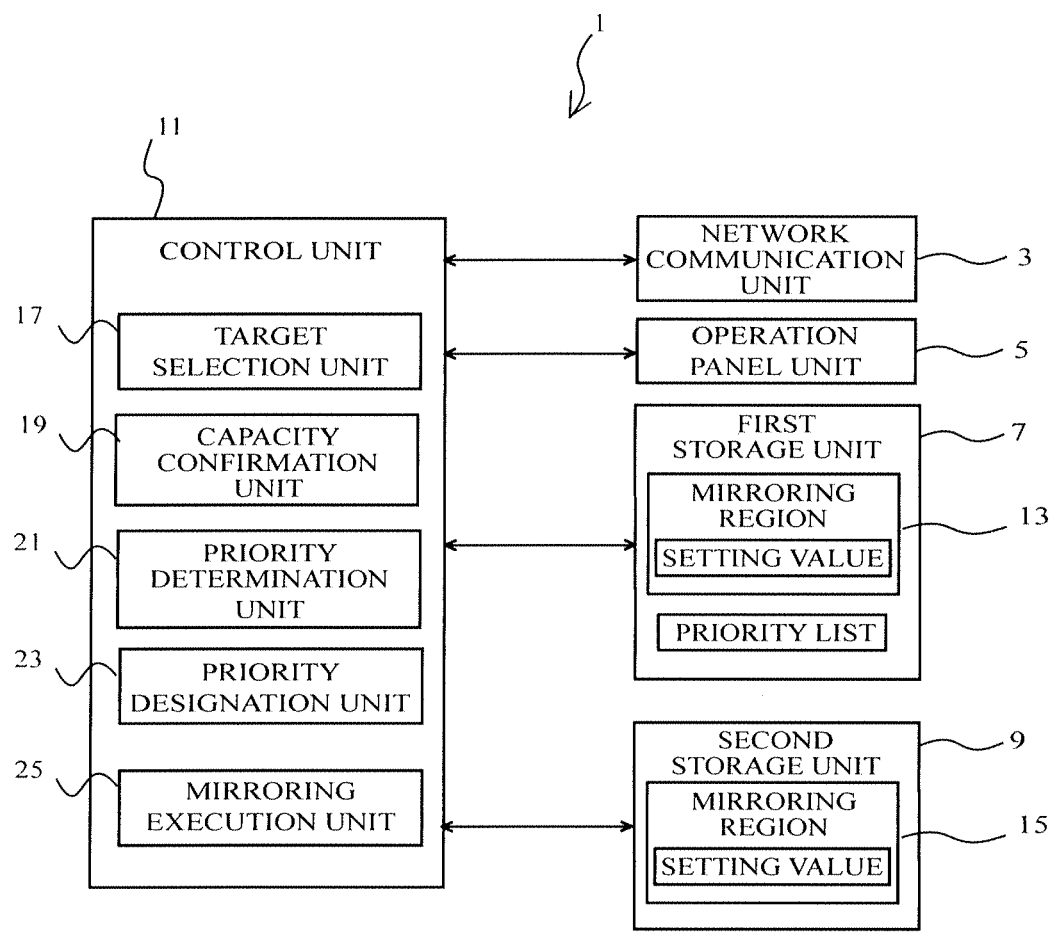
FIG. 1 illustrates a block diagram of an image forming apparatus according to an embodiment of the present disclosure.

FIG. 1 illustrates a block diagram of an image forming apparatus according to a first embodiment of the present disclosure.

As illustrated in FIG. 1, an electronic device of the first embodiment is an image forming apparatus 1 such as, for example, a digital multifunction machine or a printer. The image forming apparatus 1 has various kinds of functions such as printout and network communication. In the image forming apparatus 1, in order to obtain a function suitable for a user environment or a utilization purpose, a device setting may be changed. The image forming apparatus 1 subjects the changed device setting to mirroring and backup.

The image forming apparatus 1 at least includes a network communication unit 3, an operation panel unit 5, a first storage unit 7, a second storage unit 9, and a control unit 11, and enables mirroring.

The network communication unit 3 communicates data to a client terminal such as an information processing device through a network. The network communication unit 3 in the first embodiment enables a device setting associated with a user from the client terminal.

In addition, the device setting of the first embodiment is performed on various kinds of functions including a printing function, a network function, an address book function, and the like. In the device setting, the setting value of each of a plurality of items with respect to each function is changed. In addition, while an item of the device setting is not specifically limited, an item of the device setting may be changed by the user. Further, it may be possible to exclude an item used for basic operation control of the image forming apparatus 1.

The operation panel unit 5 includes a touch-panel liquid crystal display screen or the like. The operation panel unit 5 causes reception of an operation instruction on the image forming apparatus 1 and an operation status to be displayed. In the first embodiment, it is assumed that it may be possible for the user to directly perform a device setting through the operation panel unit 5.

The first storage unit 7 and the second storage unit 9 include non-volatile memories such as, for example, hard disk drives (HDDs) or flash memories, and include mirroring regions 13 and 15, respectively.

The control unit 11 is a control element such as a central process unit (CPU) executing a software program and causing various kinds of control or jobs to be performed. By executing a backup program, the control unit 11 in the first embodiment includes a target selection unit 17, a capacity confirmation unit 19, a priority determination unit 21, a priority designation unit 23, and a mirroring execution unit 25, as functional configurations.

As these functional configurations, in the first embodiment, the change of the setting value of each of the plural items, due to the device setting of the user, is individually stored in the mirroring region 13 in the first storage unit 7 and the mirroring region 15 in the second storage unit 9, and mirroring is performed.

This target selection unit 17 realizes a target selection procedure. If the setting value of each item is different from a corresponding initial value, the target selection unit 17 selects the setting value as a mirroring target.

The initial value of each item is held in a program region within a ROM or the like (not illustrated), and the factory setting value or the like of the image forming apparatus 1.

If a setting value has changed because of a device setting associated with the user, the target selection unit 17 compares the setting value with an initial value for the item, and determines whether or not the setting value is a different value. If the setting value is different from the initial value, the target selection unit 17 selects that setting value as a mirroring target.

The capacity confirmation unit 19 confirms the free spaces of the mirroring regions 13 and 15, used for storing the setting value serving as a mirroring target. In the first embodiment, the data size of the setting value serving as a mirroring target is compared with the sizes of the free spaces of the mirroring regions 13 and 15. The capacity confirmation unit 19 in the first embodiment confirms the free spaces of the mirroring regions 13 and 15. If the storage capacity of the first storage unit 7 is different from the storage capacity of the second storage unit 9, it may be only necessary for the capacity confirmation unit 19 to confirm the free space of the mirroring region with respect to a storage unit whose storage capacity is smaller.

The priority determination unit 21 determines the priority of mirroring, designated for the setting value serving as a mirroring target. If the free spaces of the mirroring regions 13 and 15 are insufficient relative to the setting value serving as a mirroring target, the priority determination unit 21 performs comparative determination on the priority of an existing setting value stored within the mirroring regions 13 and 15 and the priority of the setting value serving as a mirroring target.

The priority is designated with respect to each item of a device setting, and is held as, for example, such a priority list as illustrated in FIG. 2. In addition, in the first embodiment, the priority list is held within the first storage unit 7.

In the priority list in FIG. 2, with respect to each of items ranging from "Backup Data 1" to "Backup Data 1000" in the left column, the priority in the right column is indicated by one of numbers of "1" to "5". In the first embodiment, it is assumed that the priority increases with a decrease in the magnitude of the number. On the basis of this priority list, comparative determination is performed on the priorities of the existing setting value and the setting value serving as a mirroring target.

As the priority within the priority list, an initial value such as a factory setting value is assigned. Due to the priority designation unit 23, the user may change or designate a priority with respect to at least an item whose setting value may be changed.

The priority designation unit 23 realizes a priority designation procedure, and causes a priority to be designated for each item the user may change. The designation of a priority may be received as a device setting, from the client terminal or the operation panel unit 5. The priority designated by the user may be held within the first storage unit 7 in the priority list. In addition, in the first embodiment, the priority of the item "Backup Data 10" in FIG. 2 is changed to "1".

The mirroring execution unit 25 individually stores the setting value serving as a mirroring target in the mirroring regions 13 and 15, and performs mirroring. During mirroring, the mirroring execution unit 25 realizes a mirroring execution procedure. In other words, the mirroring execution unit 25 performs mirroring so as to cause a setting value, whose priority has been determined as relatively high by the priority determination unit 21, to remain in the mirroring region on a priority basis. In the first embodiment, if there is an existing setting value whose priority is less than or equal to the priority of the setting value serving as a mirroring target, the setting value serving as a mirroring target is caused to remain in place of that existing setting value. In this case, the existing setting value may be overwritten using the setting value serving as a mirroring target.

Figure 3:
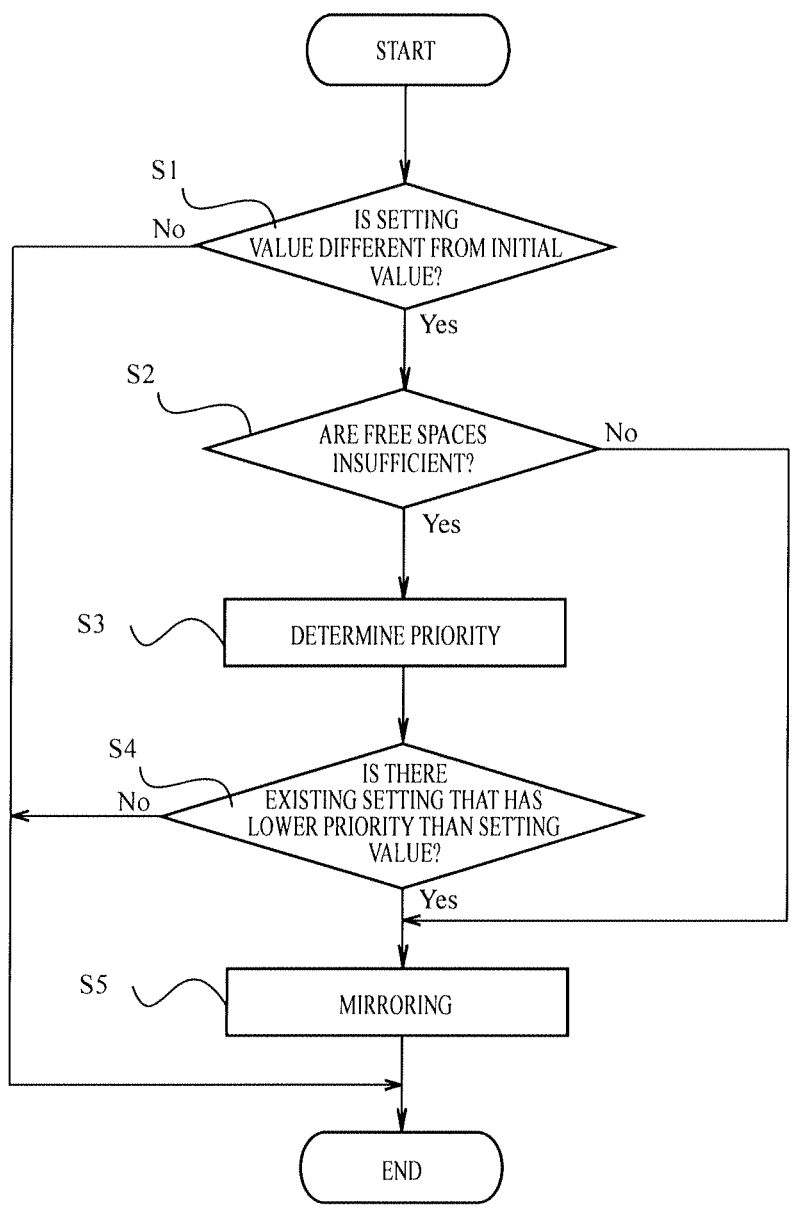
FIG. 3 illustrates backup processing due to an image forming apparatus according to an embodiment of the present disclosure.

FIG. 3 illustrates backup processing due to the image forming apparatus in FIG. 1.

In the backup processing of the first embodiment, the operation panel unit 5 receives a device setting associated with the user, and hence, the flowchart in FIG. 3 is started.

In a step S1, the target selection unit 17 reads the initial value of each item, and determines whether or not a setting value received by the device setting is a different from the initial value.

If the setting value is different from the initial value (YES), that setting value is selected as a mirroring target, and the processing transfers to a step S2. If the setting value is equal to the initial value, the backup processing is terminated.

In the step S2, the capacity confirmation unit 19 compares the data size of the setting value serving as a mirroring target with the sizes of the free spaces of the mirroring regions 13 and 15.

If the free spaces are smaller than the data size of the setting value (YES), no free space is assumed to exist, and the processing transfers to a step S3. If the free spaces are larger than the data size of the setting value (NO), a free space is assumed to exist, and the processing transfers to a step S5.

In the step S3, the priority determination unit 21 reads the priority list, and on the basis of this, performs comparative determination on the priority of an existing setting value stored within the mirroring regions 13 and 15 and the priority of the setting value serving as a mirroring target. In this way, the step S3 is completed, and the processing transfers to a step S4.

In the step S4, from the result of the comparison in the step S4, the mirroring execution unit 25 determines the presence or absence of an existing setting value whose priority is lower than the setting value serving as a mirroring target.

At this time, it is assumed that the existing setting value serving as a comparison target has a data size larger than the setting value serving as a mirroring target. It may also be assumed that a plurality of existing setting values are defined as comparison targets and a data size in total is larger than the setting value serving as a mirroring target.

If an existing setting value exists whose priority is lower than the priority of the setting value serving as a mirroring target (YES), the processing transfers to the step S5. If no existing setting value exists whose priority is lower than the priority of the setting value serving as a mirroring target (NO), the mirroring processing is terminated.

In the step S5, the mirroring execution unit 25 individually stores the setting value serving as a mirroring target in the mirroring regions 13 and 15, and performs mirroring.

At the time of transfer from the step S4, the mirroring execution unit 25 overwrites the existing setting value using the setting value serving as a mirroring target, and causes the setting value that serves as a mirroring target and whose priority is high to remain in place of that existing setting value.

As a result, even if the free spaces of the mirroring regions 13 and 15 are insufficient, it may be possible to hold a setting value for an item of the device setting, the priority of the item being high.

Figure 4A:
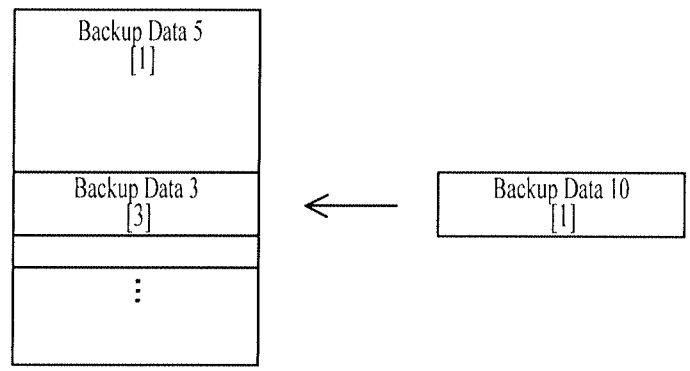
FIGS. 4A and 4B illustrate examples of a mirroring region before and after mirroring when overwriting is performed using a setting value serving as a mirroring target.
Figure 4B:
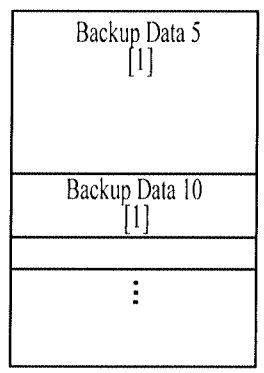

FIG. 4A illustrates a mirroring region before mirroring. FIG. 4B illustrates the mirroring region after the mirroring.

As illustrated in FIG. 4A, before the mirroring, the setting values of an item "Backup Data 5" whose priority is "1", an item "Backup Data 3" whose priority is "3", and the like are stored within the mirroring region. A setting value serving as a mirroring target is the setting value of an item "Backup Data 10" whose priority is "1".

Since the priority of the setting value serving as a mirroring target is higher than the existing setting value of the item "Backup Data 3", the existing setting value turns out to be overwritten as illustrated in FIG. 4B.

If the priorities of the setting value serving as a mirroring target and the existing setting value are equal, the setting value of one of the setting value serving as a mirroring target and the existing setting value may remain unchanged. For example, a setting may be preliminarily performed so that when priority is placed on an existing state, the existing setting value is caused to remain and when priority is placed on latest information, the setting value serving as a mirroring target is caused to remain. In addition, the user may be notified that the priorities of the setting values are equal, and the user may also be caused to select a setting value to remain unchanged.

The image forming apparatus 1 of the first embodiment is an example of an electronic device where the change of the setting value of each of the plural items, due to the device setting of the user, is individually stored in the mirroring region 13 in the first storage unit 7 and the mirroring region 15 in the second storage unit 9 and mirroring is performed. The image forming apparatus 1 may also include the target selection unit 17 selecting, as a mirroring target, the setting value of each item if the setting value is different from an initial value. The apparatus 1 may further include the priority determination unit 21 judging the priority of mirroring, designated for the setting value serving as a mirroring target. The apparatus may also include the mirroring execution unit 25 performing mirroring so as to cause a setting value, whose determined priority is relatively high, to remain on a priority basis.

Accordingly, in the first embodiment, it may be possible to cause mirroring to be performed only with respect to an item into which a different setting value is to be written due to data comparison with an initial value at the time of the device setting of the user.

Therefore, in the mirroring regions 13 and 15, a setting value is only mirrored that is desired to be changed from an initial value in accordance with a user's usage environment or a utilization purpose.

In this way, in the first embodiment, it may be possible to improve the certainty of backup without increasing the data size of a backup target or with decreasing the data size of a backup target, and the benefit of a production cost is also high.

Furthermore, in the first embodiment, by storing the setting value serving as a mirroring target in the mirroring regions 13 and 15 in accordance with the priority, it may be possible to back up as many setting values as possible of items, changed by the user, even under the restriction of the sizes of the first storage unit 7 and the second storage unit 9.

Specifically, the image forming apparatus 1 may also include the capacity confirmation unit 19 confirming the free spaces of the mirroring regions 13 and 15, used for storing the setting value serving as a mirroring target. If the free spaces are insufficient relative to the setting value serving as a mirroring target, the priority determination unit 21 may also perform comparative determination on the priority of an existing setting value stored within the mirroring regions 13 and 15 and the priority of the setting value serving as a mirroring target. If, as the result of the comparative determination, there is an existing setting value whose priority is less than or equal to the priority of the setting value serving as a mirroring target, the mirroring execution unit 25 may also perform mirroring so as to cause the setting value serving as a mirroring target to remain in that existing setting value.

Accordingly, even if the free spaces of the mirroring regions 13 and 15 are insufficient relative to the setting value serving as a mirroring target, it may be possible to hold a setting value for an item of the device setting, the item having a high priority, and it may become possible to improve the certainty of backup.

Furthermore, the priority determination unit 21 determines the priority of mirroring, designated for the setting value serving as a mirroring target. Accordingly, even if there are a plurality of setting values serving as mirroring targets and it may be difficult to store all these in the mirroring regions 13 and 15, it may be possible to cause a setting value, whose priority is relatively high among the setting values serving as mirroring targets, to remain, and it may be possible to improve the certainty of backup.

The image forming apparatus 1 of the first embodiment may also include the priority designation unit 23 causing the user to designate a priority for each item. Therefore, it may become possible to reliably back up information the user desires, owing to the mirroring.

II. Second Embodiment

FIG. 5 illustrates a priority list according to a second embodiment of the present disclosure.

In the second embodiment, as illustrated in FIG. 5, a plurality of items of a device setting are classified into a plurality of groups associated with individual functions such as a printing function, a network function, and an address book function. The same priority is designated for items configuring the same group. The priorities of items of the same group may be collectively changed by the priority designation unit 23.

According to the second embodiment, it may become possible to back up setting values for items in units of functions, on a priority basis.

A mirroring technology of the present disclosure may be applied to various kinds of electronic devices for which mirroring is desired, in addition to image forming apparatuses.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device comprising:
   a target selection unit configured to select, as a mirroring target, a setting value of each of items of the electronic device if the setting value is different from an initial value;
   a priority determination unit configured to determine a priority of mirroring, designated for a setting value serving as the mirroring target; and
   a mirroring execution unit configured to perform the mirroring so as to cause a setting value whose determined priority is relatively high to remain on a priority basis,
   wherein the priority determination unit is configured to perform comparative determination on a priority of at least one of an existing setting value and a plurality of existing setting values stored within mirroring regions used for storing the setting values and the priority of the setting value serving as the mirroring target,
   wherein the existing setting value serving as a target of the comparative determination has a data size larger than the setting value serving as the mirroring target, and
   wherein the plurality of setting values serving as a target of the comparative determination has a data size in total that is larger than the setting value serving as a mirroring target.

2. The electronic device according to claim 1, further comprising:
   a priority designation unit configured to cause a user to designate the priority for each of the items.

3. The electronic device according to claim 2, further comprising a network communication unit and an operation panel unit, the network communication unit configured to communicate data to a client terminal through a network.

4. The electronic device according to claim 3, wherein the designation of a priority may be received as a setting from the client terminal or the operation panel unit.

5. The electronic device according to claim 1, wherein
   the device setting is performed on a plurality of different functions for setting values of a plurality of the items, and
   the plurality of items are classified into a plurality of groups associated with individual functions.

6. The electronic device according to claim 5, wherein a same priority is designated for items configuring a same group.

7. The electronic device according to claim 6, wherein the priorities of items in the same group may be collectively changed.

8. An electronic device comprising:
   a target selection unit configured to select, as a mirroring target, a setting value of each of items of the electronic device if the setting value is different from an initial value;
   a priority determination unit configured to determine a priority of mirroring, designated for a setting value serving as the mirroring target;
   a mirroring execution unit configured to perform the mirroring so as to cause a setting value whose determined priority is relatively high to remain on a priority basis, and
   a capacity confirmation unit configured to confirm a free space of a mirroring region, used for storing the setting value serving as the mirroring target, a plurality of storage units including the mirroring region, respectively,
   wherein the mirroring execution unit is configured to individually store the setting value serving as a mirroring target in the mirroring region in each of the plurality of storage units and perform the mirroring, and
   wherein if the storage capacity of the plurality of storage units is different from each other, the capacity confirmation unit is configured to confirm a free space of a mirroring region with respect to a storage unit whose storage capacity is smaller.

9. The electronic device according to claim 8, wherein
   if the free space is insufficient relative to the setting value serving as the mirroring target, the priority determination unit performs comparative determination on a priority of an existing setting value stored within the mirroring region and the priority of the setting value serving as the mirroring target.

10. An electronic device comprising,
    a target selection unit configured to select, as a mirroring target, a setting value of each of items of the electronic device if the setting value is different from an initial value;
    a priority determination unit configured to determine a priority of mirroring, designated for a setting value serving as the mirroring target; and
    a mirroring execution unit configured to perform the mirroring so as to cause a setting value whose determined priority is relatively high to remain on a priority basis,
    wherein the priority determination unit is configured to perform comparative determination on a priority of an existing setting value stored within the mirroring region and the priority of the setting value serving as the mirroring target,
    wherein if, as a result of the comparative determination, there is the existing setting value less than or equal to the priority of the setting value serving as the mirroring target, the mirroring execution unit performs the mirroring so as to cause the setting value serving as the mirroring target to remain in place of the existing setting value,
    wherein if, as a result of the comparative determination, the priorities of the setting value serving as a mirroring target and the existing setting value are equal, the mirroring execution unit performs, for the remaining one of the setting value serving as the mirroring target and the existing setting value, the mirroring based on a setting that is performed so that (i) when priority is placed on an existing state, the existing setting value is caused to remain and (ii) when priority is placed on latest information, the setting value serving as a mirroring target is caused to remain.

11. The electronic device according to claim 10, wherein the existing setting value may be overwritten using the setting value serving as a mirroring target.

12. A non-transitory computer readable recording medium that stores a backup program for an electronic device, the backup program comprising:
   a first program code that causes the computer to select, as a mirroring target, a setting value of each of items of the electronic device if the setting value is different from an initial value;
   a second program code that causes the computer to determine a priority of mirroring, designated for a setting value serving as the mirroring target; and
   a third program code that causes the computer to perform the mirroring so as to cause a setting value whose determined priority is relatively high to remain on a priority basis,
   wherein the second program code causes the computer to perform comparative determination on a priority of at least one of an existing setting value and a plurality of existing setting values stored within mirroring regions used for storing the setting values and the priority of the setting value serving as the mirroring target,
   wherein the existing setting value serving as a target of the comparative determination has a data size larger than the setting value serving as the mirroring target, and
   wherein the plurality of setting values serving as a target of the comparative determination has a data size in total that is larger than the setting value serving as a mirroring target.

13. A backup method comprising:
   selecting, via a target selection unit, a setting value of each of items of an electronic device, as a mirroring target, if the setting value is different from an initial value;
   judging, via a priority determination unit, a priority of mirroring, designated for a setting value serving as the mirroring target; and
   performing, via a mirroring execution unit, the mirroring so as to cause a setting value whose determined priority is relatively high to remain on a priority basis,
   wherein the judging includes, via the priority determination unit, performing comparative determination on a priority of at least one of an existing setting value and a plurality of existing setting values stored within the mirroring regions used for storing the setting values and the priority of the setting value serving as the mirroring target,
   wherein the existing setting value serving as a target of the comparative determination has a data size larger than the setting value serving as the mirroring target, and
   wherein the plurality of setting values serving as a target of the comparative determination has a data size in total that is larger than the setting value serving as a mirroring target.

14. The backup method of claim 13, further comprising:
   confirming, via a capacity confirmation unit, a free space of the mirroring region, used for storing the setting value serving as the mirroring target, a plurality of storage units including the mirroring region, respectively,
   wherein performing, via the mirroring execution unit, the mirroring includes individually storing the setting value serving as a mirroring target in the mirroring region in each of the plurality of storage units and performing the mirroring, and
   wherein confirming includes, if the storage capacity of the plurality of storage units are different from each other, via the capacity confirmation unit, confirming a free space of a mirroring region with respect to a storage unit whose storage capacity is smaller.

15. The backup method of claim 14, wherein if the free space is insufficient relative to the setting value serving as the mirroring target, the priority determination unit performs comparative determination on a priority of an existing setting value stored within the mirroring region and the priority of the setting value serving as the mirroring target.

16. The backup method of claim 15, wherein if, as a result of the comparative determination, there is the existing setting value less than or equal to the priority of the setting value serving as the mirroring target, the mirroring execution unit performs the mirroring so as to cause the setting value serving as the mirroring target to remain in place of the existing setting value,
   wherein if, as a result of the comparative determination, the priorities of the setting value serving as a mirroring target and the existing setting value are equal, the mirroring execution unit performs, for remaining one of the setting value serving as the mirroring target and the existing setting value, the mirroring based on a setting that is performed so that (i) when priority is placed on an existing state, the existing setting value is caused to remain and (ii) when priority is placed on latest information, the setting value serving as a mirroring target is caused to remain.

17. The backup method of claim 16, further comprising:
   overwriting the existing setting value using the setting value serving as the mirroring target.

18. The backup method of claim 13 further comprising:
   designating, via a priority designation unit, the priority for each of the items.

19. The backup method of claim 13 further comprising:
   performing the device setting on a plurality of different functions for setting values of a plurality of the items, and
   classifying the plurality of items into a plurality of groups associated with individual functions.

20. The backup method of claim 19 further comprising:
   designating the same priority for items configuring a same group.

* * * * *